May 24, 1966   J. W. EDGEMOND, JR   3,252,540
OPERATING CONTROL FOR HYDRAULICALLY POWERED FRUIT
HARVESTING MACHINE
Original Filed May 28, 1962                           4 Sheets-Sheet 1
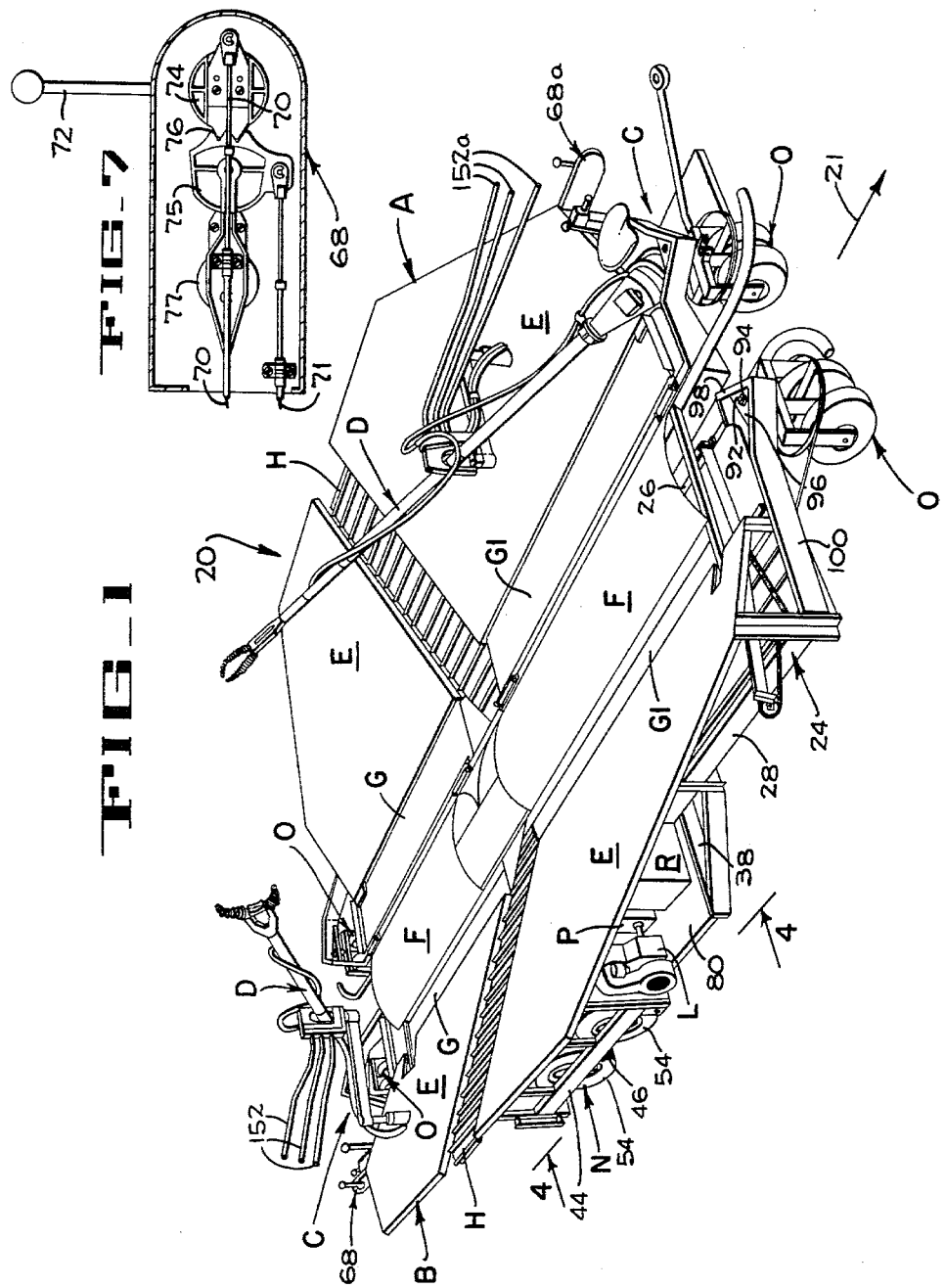
INVENTOR
JOHN W. EDGEMOND, JR.
BY *Hans G. Hofmeister*
ATTORNEY

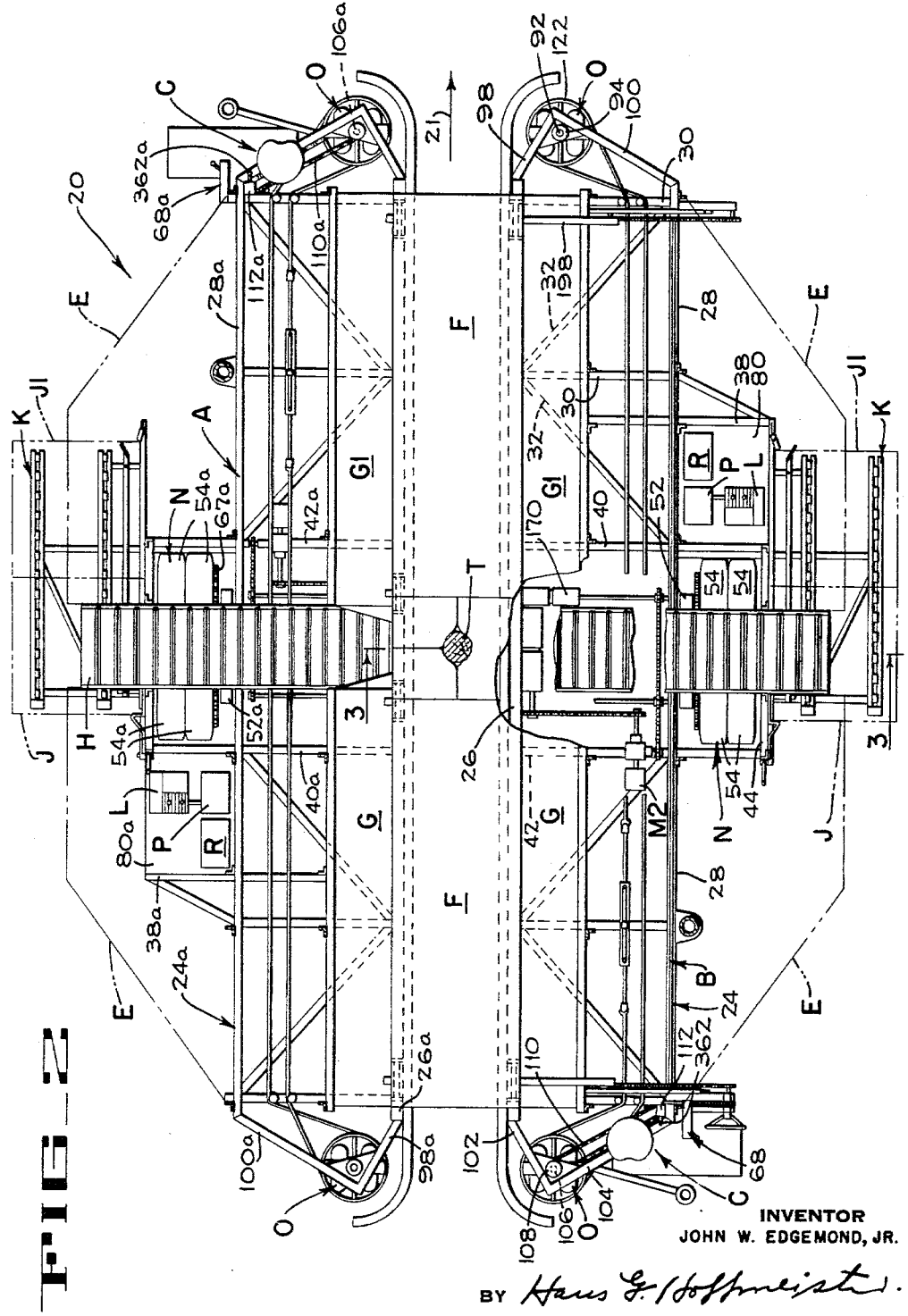

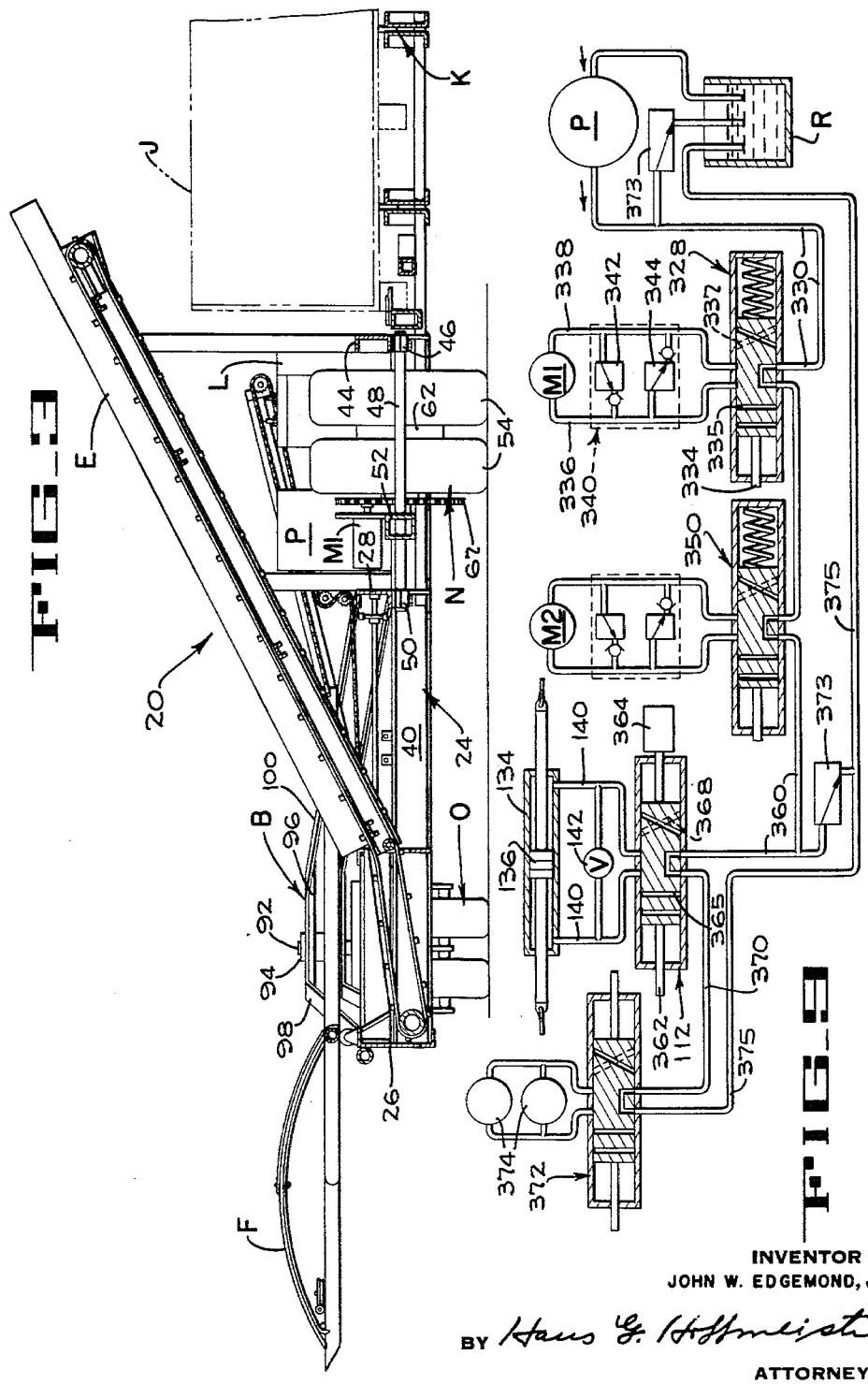

May 24, 1966
J. W. EDGEMOND, JR
3,252,540
OPERATING CONTROL FOR HYDRAULICALLY POWERED FRUIT
HARVESTING MACHINE
Original Filed May 28, 1962
4 Sheets-Sheet 4
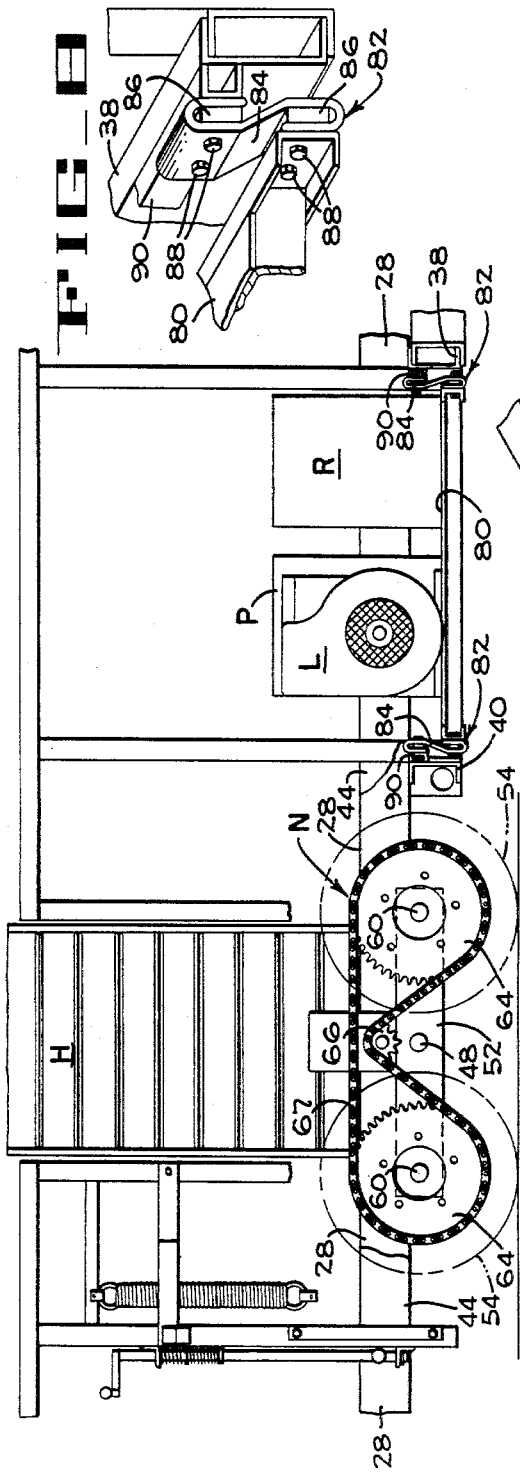
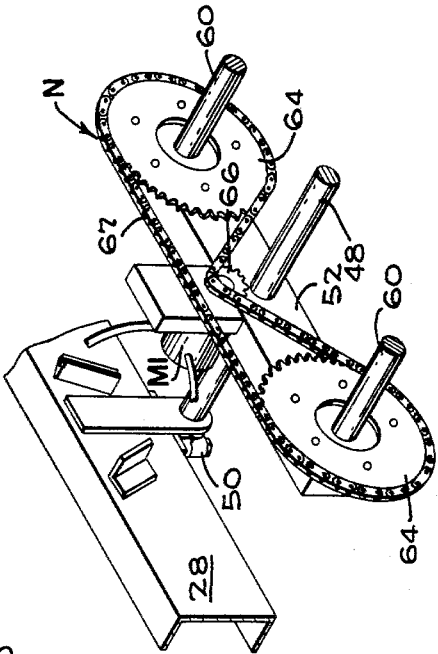
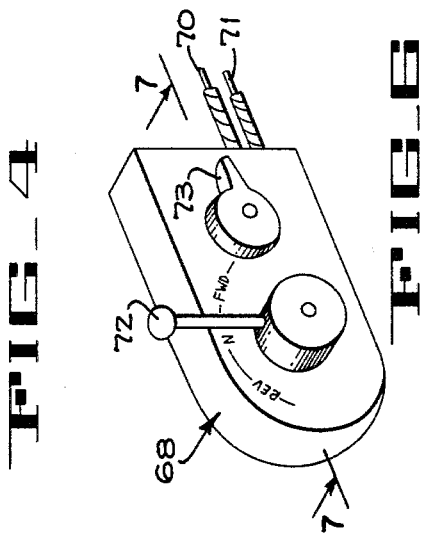
INVENTOR
JOHN W. EDGEMOND, JR.
BY *Hans G. Hofmeister*
ATTORNEY United States Patent Office 3,252,540
Patented May 24, 1966

3,252,540
OPERATING CONTROL FOR HYDRAULICALLY POWERED FRUIT HARVESTING MACHINE
John W. Edgemond, Jr., Los Gatos, Calif., assignor to FMC Corporation, San Jose, Calif., a corporation of Delaware
Original application May 28, 1962, Ser. No. 198,231. Divided and this application Dec. 28, 1964, Ser. No. 429,699
3 Claims. (Cl. 180—77)

The present invention pertains to a machine for harvesting fruit from trees, and more particularly to an improved operating control and drive system for an improved drive and control arrangement for a harvesting machine having means for dislodging, collecting and boxing the fruit. This application is a division of Edgemond, Serial No. 198,231, Fruit Harvesting Machine, and is assigned to the same assignee as the parent application.

Several different types of fruit harvesting machines have been devised in the past in an attempt to provide fruit growers with means for avoiding the uncertainty of having transient workers at hand when the proper harvesting time arrives, and for economic and other reasons. Certain disadvantages of these machines, however, have largely offset the advantages which have been obtained. For example, many such machines are difficult to maneuver into harvesting positions. As a result, not only is much time lost from the fruit harvesting operations, but the tree trunks are often damaged because the harvester cannot be precisely controlled on the rough orchard ground. The cambium layer of the tree trunk, consequently, is sometimes scarred to such an extent that the tree may die. Trees thus damaged are, at the very least, made more prone to disease and require more care than the healthy trees, and damage to the cambium layer inhibits the growth of the tree.

The harvesting machine drive and control mechanism of the present invention substantially overcomes the above-mentioned disadvantages by providing precise controllability for each of two independently steered and separately powered cooperating machine sections which are capable of being rapidly maneuvered into harvesting positions along a row of trees, and are easily and quickly moved from one tree row to the next. The harvesting machine simultaneously harvests the entire crop from the tree, packs the harvested fruit in large open top boxes, and discharges the boxes in the lane between adjacent tree rows for easy access to the filled boxes by the usual field trucks.

Accordingly, one of the objects of the present invention is to provide an improved drive and control mechanism for a fruit harvesting machine.

Another object of this invention is to provide an improved fruit harvesting machine control mechanism which enables the machine adapted to be maneuvered into fruit harvesting positions with little danger of scarring the trees, and without requiring a reverse operation to move from a harvested tree to the next tree in the row.

Another object is to provide an improved power drive train and an improved operating control system for a self-propelled fruit harvesting machine.

Other objects and advantages of the present invention will become apparent from the following description, and from the accompanying drawings, wherein:

FIGURE 1 is a diagrammatic perspective of two cooperating separate machine sections comprising the fruit harvesting machine of the present invention, and is viewed from the leading end of the fruit harvesting machine.

FIGURE 2 is a diagrammatic plan of the harvesting machine with the fruit collecting panels removed to show the support, drive, and steering structures which would otherwise be concealed.

FIGURE 3 is a diagrammatic vertical section, taken along lines 3—3 on FIGURE 2, of one of the two separate machine sections comprising the harvesting machine.

FIGURE 4 is an enlarged fragmentary side elevation, with parts broken away and parts shown in phantom lines, taken in the directions of the arrows 4—4 of FIGURE 1, and particularly illustrating details of the traction drive train and a box carrier mounting of one of the two sections of the harvesting machine.

FIGURE 5 is a schematic fragmentary perspective of the drive and the mounting mechanism for the driving wheels of one of the two cooperating sections of the machine.

FIGURE 6 is a perspective of a combined throttle and hydraulic valve control unit for governing drive and pumping means associated with one of the two harvesting machine sections.

FIGURE 7 is a vertical section taken along line 7—7 of FIGURE 6.

FIGURE 8 is a fragmentary perspective of a shock damping mounting for isolating vibrations, originating at the engine and pump, from the main frame of one machine section.

FIGURE 9 is a schematic diagram of the hydraulic circuit for controlling the conveyors, elevator, shaker boom and traction drive motor of one of the two separate machine sections which comprise the harvesting machine.

In general, the fruit harvesting machine 20 of the present invention (FIGS. 1 and 2) is formed in two separate, elongate, self-powered machine sections A and B which, at the start of a harvesting operation, are moved forwardly into harvesting position in the direction of the arrow 21 and cooperate to form a single unit surrounding a centrally positioned tree trunk T in a row of orchard trees.

Each self-powered section A and B is controlled from a separate control station C by an operator who maneuvers the section into harvesting position and then manipulates the controls of a shaker boom structure D that is mounted on the section adjacent station C. The two shaker booms D are engageable with selected limbs on opposite sides of the tree and dislodge the fruit by rapidly vibrating the limbs. Fruit which is thus dislodged drops onto inclined guide panels E and onto a central, two-part shield F, which is carried by the machine section B and bridges the gap between the two machine sections A and B. The panels E and the shield F direct the fruit to a longitudinally aligned pair of oppositely moving, belt conveyors G and G1 in each section of the harvesting machine 20, and each pair of conveyors G and G1 carry the fruit to an elevator H which is positioned between the conveyors.

Each elevator H (FIG. 2) discharges the fruit into the trailing box J of two large open top boxes J and J1 (shown in phantom outline) which are carried by an outrigger box carrier mechanism K that is pivotally mounted on the frame of the machine. The box carriers K are removable to reduce the width of the machine sections A and B for highway travel, and have been omitted from FIGURE 1. When the trailing boxes J are filled with fruit, they are discharged rearwardly from the box carriers K onto the ground to be picked up later by a fork lift and loaded onto a truck for conveyance to the packing shed.

Each machine section A and B (FIG. 2) is individually powered by a gasoline engine L which drives a hydraulic pump P, the pump energizing a hydraulically actuated drive train which powers a drive wheel assembly N. Steering of each machine section is effected by two steerable wheel assemblies O, one at the leading end of the machine section and a similar wheel assembly O at the trailing end of the section.

The two machine sections A and B of the harvesting machine 20 are identical in construction except for the box carriers K, the central shield F which is carried by the machine section B, and minor details associated with the box carrier mounting. Thus, aside from the exceptions noted, the machine section B may be considered to be the machine section A turned end for end. Although the following detail description is for the greater part directed to the machine section B, it is equally applicable to the machine section A, and the parts of section A, that correspond to parts of B, will be given the same reference numerals as the numerals on B with the suffix "a."

Section B (FIGS. 1–3) of the harvesting machine 20 is provided with an elongate frame structure 24 which includes two longitudinal main channel members 26 and 28. Near the central portion of the frame 24 three transverse frame channels 38, 40 and 42 are secured to the longitudinal channels 26 and 28, and project outwardly beyond the channel 28 to mount the drive wheel assembly N for the machine section, and also to carry the associated box carrier K. The channels 40 and 42 (FIGS. 2, 3 and 4) are interconnected at their outer ends by a channel member 44 which has a bearing 46 secured to its lower edge. The bearing 46 mounts one end portion of a rockshaft 48 which projects transversely of the machine between the front and rear wheels of the wheel assembly N and is journalled in a bearing 50 (FIG. 5) that is bolted to the lower edge of the channel 28.

The leading and trailing pairs of the drive wheels 54 of the drive wheel assembly N (FIGS. 3 and 4) are rotatably mounted upon staub axles 60 which are welded to a beam 52 and project outwardly therefrom. Each pair of drive wheels is provided with a single hub assembly 62 which is journalled on axle 60 and is bolted to a cylindrical housing that is fixed to a driven sprocket 64. The two sprockets 64 (FIG. 5) are aligned with the drive sprocket 66 of a hydraulic motor M1, which is mounted upon the upper flange of the wheel support beam 52, and are interconnected for rotation with the sprocket 66 by an endless chain 67. Motor M1 is controlled by a combined throttle and hydraulic valve control unit 68 (FIGS. 2, 6 and 7) which is mounted at the operator's station C.

The throttle and valve control unit 68 is a conventional, commercially available control device of the type used in conjunction with the engine throttle and gear change mechanisms in small boats. Each of the control units 68 used in the present machine is a Model ML Single Lever Outboard Motor Control, manufactured by the Morse Instrument Company of Hudson, Ohio. Each control unit is provided with two flexible control cables 70 and 71 that are respectively connected to the throttle of engine L and to a directional control valve 328 (FIG. 9), later described, which governs the drive motor M1. By means of the internal mechanism of the control unit 68 (FIGS. 6 and 7), the throttle cable 70 may be actuated under certain conditions by either a shift lever 72 or a throttle lever 73, but the cable 71 can be actuated only by the shift lever 72.

The shift lever 72 is movable from a neutral, upright position to either reverse or forward. When the lever moves away from neutral, no appreciable throttle cable actuation immediately occurs because the end of cable 70 (FIG. 7) extends across the center of a disc 74 which is turned by the shift lever, and is anchored to the far side of the disc. At the anchored end of the cable moves away from the neutral, or centered position shown, the throttle cable 70 progressively opens the throttle of the engine L. At the same time, the valve cable 71 opens the directional control valve 328 (FIG. 9) which controls the drive motor M1 because the valve cable 71 (FIG. 7) is anchored to a disc 75 which is turned by the disc 74 due to interengaging teeth at 76 of the two discs 74 and 75.

The throttle lever 73 (FIG. 6) is connected to a disc 77 (FIG. 7) to which a part of the throttle cable 70 is anchored. As the throttle lever 73 is swung upward from the horizontal idle position shown in FIGURE 6, the cable 70 opens the throttle, but due to the particular internal construction of the control unit 68, the valve cable 71 will not in this instance be actuated. Accordingly, when the shift lever 72 is moved toward forward or reverse positions from neutral, the engine L speeds up and the motor M1 is rotated in the direction the lever 72 is moved, by pressurized hydraulic fluid transmitted from the pump P. The hydraulic circuit is so arranged that when the motor M1 is not driven, or in other words when the shift lever 72 is at neutral position, the pressurized fluid therein is balanced so that the motor "locks up" to arrest the motor sprocket 66. The motor M1, accordingly, acts as a brake to stop the drive wheels 54, and keeps the machine braked during the fruit harvesting operation. When the harvesting machine section B is maneuvered into an operative position by appropriate manipulation of the shift lever 72 and the motor M1 is holding the machine section braked in position, the throttle lever 73 is then advanced so that the engine continues to drive the pump P and energize other hydraulically powered mechanisms essential to the harvesting operation.

In general, the mechanism of the control unit is such that shift lever 72 can be actuated only when throttle lever 73 is in idle position and, likewise, lever 73 can be actuated only when lever 72 is in neutral position. Accordingly, when a machine section A or B is being maneuvered to a position adjacent a tree, throttle lever 73 is in idle position and it cannot be accidentally moved out of this position while the vehicle is being maneuvered by shift lever 72. Similarly, when the machine is anchored adjacent the tree, the throttle lever 73 is actuated to control the speed of the operating mechanisms and the shift lever 72 cannot be accidentally moved from neutral position.

The engine L (FIGS. 2, 4 and 8), the pump P and a hydraulic reservoir R are mounted upon a platform 80 which is suspended from the outer portions of the channels 38 and 40. The suspension of platform 80 is by means of four shock absorbing mountings 82, only two of which are shown. Each shock mounting 82 includes a section of rubberized fabric belting material 84, the upper and lower end portions of which are each doubled over a spacer block 86. Bolts 88 project through each doubled end portion of the belt 84, the upper bolts securing the shock mounting to a channel 90 which is welded to the channel member 38, and the lower bolts securing the shock mounting to the adjacent edge portion of the platfom 80. Due to the resiliency of the belt material 84 in each shock mounting, vibrations originating at the engine L and pump P are damped by the shock mountings and are prevented from being transmitted to the main frame 24. Flexible hydraulic connections, not shown, to the pump P and reservoir R accommodate the movement of the platform 80 relative to the frame 24.

Steering of the harvesting machine 20 (FIGS. 1 and 2) is effected in a novel manner enabling each machine section A and B to pivot about the axis of the tree trunk T by means of the simultaneously steered, leading and trailing wheel assemblies O of each machine section. The leading wheel assembly O of section B is provided with a vertical turning pin 92 that is rotatable in a bearing 94 which is secured to a horizontal mounting plate 96. The mounting plate 96 is welded to the frame 24 at the juncture of upwardly and inwardly directed portions 98 and 100 of the longitudinal frame channels 26 and 28, respectively.

The channels 26 and 28 are similarly formed at the trailing end of the harvesting machine section B by upwardly and inwardly directed portions 102 and 104, and the trailing wheel assembly O is provided with a vertical turning pin 106 that is rotatable in a bearing 108. For a purpose which will be mentioned later in connection with a power steering feature of the machine, a chain and sprocket drive 110 is connected to the turning pin 106 and to a hydraulic steering control valve 112 (FIG. 9) which is mounted upon the frame 24 adjacent the operator's station C.

The hydraulic control circuit of the drive motor M1 (FIG. 9) includes the directional control valve 328 which is connected by a conduit 330 to the discharge outlet of the pump P. The control valve 328 is actuated by mechanical linkage, not shown, that is connected between its actuating rod 334 and the valve control cable 71 (FIGS. 6 and 7) of the combined throttle and hydraulic valve control unit 68. When the shift control lever 72 of the control unit 68 is moved in the direction of forward advance of the machine section B, the core of the valve 328 is shifted to the right, and pressurized fluid is circulated from conduit 330 through valve passage 335 and conduit 338 to the drive motor M1 in a direction causing the drive wheels 54 to propel the machine section along the row of trees. At the same time, the throttle of the engine L is opened by the cable 70, as previously mentioned, and the more the shift lever 72 is advanced from neutral, the greater the speed of the machine section. If the core of the valve 328 is shifted in the opposite direction, a slanted passage 337 through the valve core directs pressurized fluid to conduit 336 to reverse the direction of the hydraulic fluid, and the machine travels backward. When the shift lever 72 is returned to neutral, fluid flow is interrupted to both the conduits 336 and 338 of the motor M1 and the motor thus tends to be driven by the wheels 54 through the chain drive due to the momentum of the machine.

It will be noted that, when the shift lever 72 is put into neutral position and the momentum of the machine tends to drive the motor M1, the fluid in the system will be pumped by the motor into one of the lines 336 or 338, according to which direction the motor M1 is being rotated. A valve unit 340 is connected in the system to prevent the free circulation of fluid so that, as soon as the shift lever 72 is put into neutral, the hydraulic system will act as a brake in that it resists rotation of motor M1. The conduits 336 and 338, accordingly, are interconnected by the valve unit 340 which includes a combination pressure-relief and check valve 342 which will not pass hydraulic fluid that is below a pressure of 1000 p.s.i. from conduit 338 to conduit 336. A similar combination pressure-relief and check valve 344 of the valve 340 will not pass fluid from conduit 336 to conduit 338 until it is at a pressure of 1000 p.s.i. It will be apparent, therefore, that the motor M1 is subject to a rapid braking action when its control valve 328 is shifted from either forward or reverse driving position to neutral because when the motor M1 tends to pump the fluid in its circuit, the valve unit 340 opposes such pumping action, with the result that the drive wheels 54 are rapidly braked, and when the machine stops, it is immobilized by the drive motor regardless of the degree of slope upon which the machine may be operating.

While the steering control valve 112 is diagrammatically illustrated in FIGURE 9 as having a core that is slidable longitudinally in a housing to selectively direct fluid to opposite ends of a power steering cylinder 134, the valve actually used is a rotary valve Model IV–205 marketed by the Char-Lynn Company, of Minneapolis, Minnesota. The core of the rotary valve is connected to a control lever 362 (FIG. 2) which is located adjacent the operator's station and is mounted for swinging movement about a vertical axis. If the lever is swung in one direction, pressurized fluid is directed from pressure conduit 360 to one side of piston 136 in cylinder 134 while, if the lever 362 is swung in the opposite direction, the pressurized fluid will be directed to the opposite side of piston 136. The angular position of the control lever 362 relative to a straight-ahead neutral position will correspond closely to the angular position of the steerable wheels O.

The spindle of the trailing wheel assembly O (FIG. 2) is connected by the chain drive 110 to valve 112 so that when the wheel assembly O is turned in response to actuation of control lever 362, it actuates a servo-control 364 (FIG. 9) which is built into the rotary valve 112. The servo control is so connected to the core of the valve that if the control lever 362 is swung through a fixed angular distance, such as 10 degrees, to direct fluid to cylinder 134 to turn the wheel assembly O approximately 10 degrees, the servo control will be actuated to stop the flow of pressurized fluid to the cylinder when the wheels have been turned. If the control lever is swung slowly through a large angular displacement, the servo control will start moving as soon as the wheels O start to pivot. However, the servo control will not stop the flow of pressurized fluid to the cylinder 134 until the swinging movement of the control lever is stopped.

In the hydraulic circuit shown, steering movement of the wheels in one direction is carried out by shifting the core of the valve 112 to the right to align a passage 365 with the pressure conduit 360 so that fluid is directed along conduit 140 to one side of the piston 136. Steering of the wheels in the opposite direction is carried out by shifting the valve core to the left to align a slanted passage 368 with pressure conduit 360 and direct fluid to the left side of piston 136. In such an arrangement, the servo control 364 would be arranged to slidably adjust the valve core in response to movement of the wheel assembly O.

The pressurized fluid in line 360 also enters a pressure line 370 which is connected to a shaker boom control valve 372. The valve 372 is controlled by one of several control rods 152 (FIG. 1) and governs two hydraulic motors 374, the valve and both motors being a part of the shaker boom structure D. Various other standard components of the hydraulic circuit include suitable pressure relief valves 373 and a conduit 375 which returns the pressurized fluid to the reservoir R, all in the manner well known in the art. The motor M2 and its control valve 350 govern operation of the elevator H, and are more fully described in the previously identified parent application.

While a particular embodiment of the present invention has been shown and described, it will be understood that the particular details herein set forth are capable of modification and variation without departing from the principles of the invention, and that the scope of the invention should be limited only by the scope and proper interpretation of the claims appended hereto.

The invention having thus been described, that which is believed to be new, and for which protection by Letters Patent is desired, is:

1. In a harvester a support structure, drive wheels supporting said structure, an engine mounted on said structure and having speed control means, hydraulically powered drive means connecting said engine with said drive wheels and having directional control valve means operatively associated therewith, and a control unit connected to said engine speed control means and to said directional control valve means, said control unit being arranged to selectively actuate said engine speed control means and said directional control valve means simultaneously, or to simultaneously actuate said speed control means and lock said directional control valve means against actuation.

2. In a fruit harvesting machine a frame, a drive wheel supporting said frame, an engine mounted on said frame and having a speed control throttle, a hydraulic motor connected to said drive wheel, a hydraulic pump driven by said engine, a multi-position valve controlling fluid discharge conduits from said pump to said motor, and a control unit connected to said throttle and to said valve, said control unit having a first operating lever for selectively actuating the valve and throttle simultaneously when moved in either direction from a neutral position, and having a second operating lever for actuating said throttle only when said first operating lever is in said neutral position.

3. In a fruit harvesting machine, a frame; a drive wheel supporting said frame; an engine mounted on said frame and having speed control means; a hydraulic pump driven by said engine; a reversible hydraulic motor connected to said drive wheel and powered by said pump; a directional valve connected to said motor, said valve having operating positions respectively locking the motor from rotation, driving the motor in one direction, and driving the motor in the opposite direction; and a control unit connected to said valve and to said speed control means, said control unit being arranged to selectively actuate said engine speed control means and said valve means to either driving position simultaneously, or to simultaneously actuate said speed control means and isolate said valve means from actuation.

References Cited by the Examiner
UNITED STATES PATENTS

| | | | |
|---|---|---|---|
| 2,226,591 | 12/1940 | Swenson et al. | |
| 2,257,752 | 10/1941 | Nicol | 74—472 |
| 2,907,421 | 10/1959 | Morse et al. | 192—.096 |
| 2,987,152 | 6/1961 | Morse | 74—472 |

BENJAMIN HERSH, *Primary Examiner.*

E. E. PORTER, *Assistant Examiner.*